Jan. 16, 1968 A. D. HASLEY 3,364,415

MAGNETIC PULSE EXCITATION OF FALLOU GENERATOR

Filed Jan. 3, 1966 3 Sheets-Sheet 1

INVENTOR
A. D. HASLEY
BY
ATTORNEY

VOLTAGE ACROSS INDUCTOR 19

CURRENT PULSES IN INDUCTOR 19

PULSE-MODULATED SELF-STARTING
FALLOU GENERATOR

VOLTAGE ACROSS FALLOU INDUCTOR 11

VOLTAGE ACROSS FALLOU NON-LINEAR INDUCTOR 12

VOLTAGE ACROSS FALLOU INDUCTORS 11 AND 12

SUPER POSITION OF 60 CPS INPUT VOLTAGE AND CURRENT PULSES IN THE PULSE MODULATOR

United States Patent Office 3,364,415
Patented Jan. 16, 1968

3,364,415
MAGNETIC PULSE EXCITATION OF FALLOU GENERATOR

Andrew D. Hasley, Basking Ridge, N.J., assignor to Bell Telephone Laboratories Incorporated, New York, N.Y., a corporation of New York
Filed Jan. 3, 1966, Ser. No. 518,037
7 Claims. (Cl. 321—69)

This invention relates to magnetic subharmonic generators and in particular to a new starting arrangement for the so-called "Fallou" type generator.

The well-known Fallou generator described in Patent 1,633,481, issued to J. G. Fallou on June 21, 1927 essentially is a series circuit consisting of a linear inductance, a nonlinear inductance and a capacitance. With appropriate initial conditions and a substantially sinusoidal input voltage of sufficient amplitude, odd order subharmonics may be generated. The output voltage appearing across the capacitor is a subharmonic of the sine wave. Its predominating frequency is a function of values of the linear inductance and the capacitance.

The Fallou generator by itself is not self-starting and must be shock-excited into operation. A circuit transient must be introduced such that the nonlinear inductor saturates at an appropriate time as, for example, when the capacitor is charged to its peak value. This shock-excitation is achieved typically by mechanical relays which momentarily short out a portion of the nonlinear inductance. Relays, however, present maintenance problems because of relay contact arcing and erratic behavior after prolonged periods of nonuse.

This invention concerns a further method for shock-exciting the Fallou circuit into operation that is less expensive and more reliable than methods involving a mechanical relay.

An object of the invention is to increase the reliability of the Fallou type subharmonic generator.

A further object of the invention is to achieve initial starting of this type generator under a considerable load, and sustain its operation.

An added object of the invention is to offer an inexpensive and reliable alternative to mechanical relay starting of Fallou generators.

These and other objects are achieved pursuant to the invention by a magnetic pulse modulator circuit connected in parallel with the Fallou generator across the input, and consisting of a series LC tuned circuit and a saturating inductor designed to saturate every three half-cycles of the input voltage, with the resultant pulse energy applied to the nonlinear Fallou inductor to drive this circuit into its characteristic mode.

According to one aspect of the invention, application of a 60-cycle input voltage to the pulse modulator circuit causes an exponentially increasing sine wave to appear across its capacitor. A flux in the nonlinear inductor is produced which is:

$$\phi=\frac{1}{N}\int e_c dt$$

where $e_c$ is the capacitor voltage and N is the turns of the nonlinear inductor. The values of L and C in the tuned circuit are adjusted such that over a period of three half-cycles of the input voltage:

$$\frac{1}{N}\int e_c dt=\phi_s$$

where $\varphi_s$ is twice the saturation flux of the nonlinear inductor in the pulse circuit. Thus, whenever the nonlinear inductor of the pulse circuit saturates, the stored energy in the capacitor causes a high current pulse to flow through the saturated nonlinear inductor. As saturation occurs every three half-cycles of the input voltage, the repetition rate of these pulses is twenty cycles per second. These pulses are applied to the Fallou generator by coupling windings between the Fallou nonlinear inductor and that of the pulse circuit. Because of the relatively large capacitor employed in the Fallou section, the starting pulses do not appear in the Fallou output. The three-half cycle period is chosen for illustration of the principle because typically 20 cycles per second must be derived from a 60 cycle-per-second source.

A prime feature of the invention, accordingly, resides in the application of short pulses from a magnetic pulse generator to the nonlinear inductor of the Fallou circuit, at a rate that is a selected subharmonic of the input frequency and also is substantially the same as the designed Fallou subharmonic mode.

These and other objects and features of the invention will be readily apprehended in the description to follow of an illustrative embodiment, and in the drawing in which.

In the various figures, like numbers designate the same elements.

Figure 1:
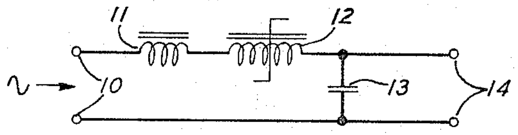
FIG. 1 is a circuit schematic of a basic Fallou generator.
Figure 2:
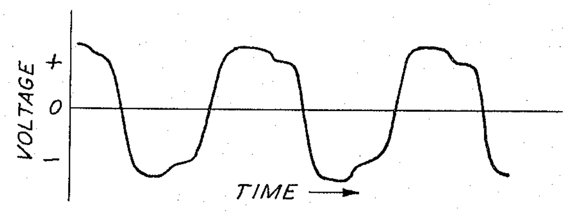
FIG. 2 is a graph of the output voltage waveform of the generator in FIG. 1.

FIG. 1 shows a basic Fallou generator in which a sinusoidal input voltage is applied across terminals 10 to a series circuit including a linear inductor 11, a nonlinear inductor 12 and a capacitor 13. With appropriately chosen values of L and C, the output voltage which is taken across capacitor 13 at output terminals 14 is an odd subharmonic of the input sine wave. In most instances a transformer is used at the output to provide isolation between the input and the load. The basic output voltage waveform of this circuit is shown in FIG. 2.

A brief review of the Fallou generator's operation will assist in understanding the application of the instant invention to it. The Fallou circuit shown in FIG. 1 may be regarded for purposes of analysis to have two possible states, corresponding to the saturated and unsaturated states of the nonlinear inductor 12.

Figure 3:
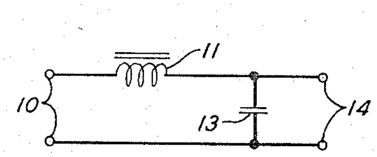
FIGS. 3 and 4 are circuit schematics depicting equivalent circuits of the Fallou generator.

FIG. 3 represents a linear equivalent circuit of the generator with the nonlinear inductor in the saturated state. In this circuit the total inductance is nearly equal to that of the linear inductance since the nonlinear inductor behaves like a short circuit. If capacitor 13 is charged by the most negative peak of the output waveform and if the input voltage is a sinusoid, then the output voltage taken across capacitor 13 consists of two parts: a steady state component due to the input voltage, and a transient component due to the oscillations in the LC circuit caused by the initial voltage on the capacitor 13. The superposition of these two components corresponds to the relatively vertical portions of the output voltage waveform of FIG. 2.

Figure 4:
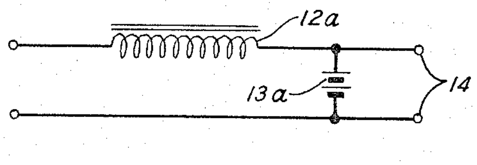

When the output voltage reaches its positive peak the current in the nonlinear inductor is such that the latter comes out of saturation. The equivalent circuit of the generator now is as shown in FIG. 4. The nonlinear inductor appears as a very high inductance 12*a*. The capacitor 13 is portrayed as a battery 13*a* to emphasize the fact that the high value of inductance in the circuit at this time blocks the input voltage from the output and, accordingly, the input voltage has practically no effect on the output voltage. The capacitor is essentially floating until the nonlinear inductor re-saturates. This interval of time corresponds to the flat portion of the output voltage shown in FIG. 2. During this interval the volt-time area of the nonlinear inductor is increasing, and when it reaches a large enough value the inductor re-saturates and the cycle repeats.

Figure 5:
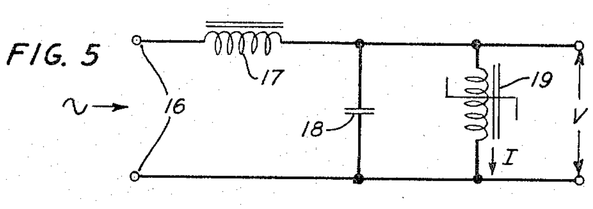
FIG. 5 is a circuit schematic illustrating a magnetic pulse modulator.
Figure 6:
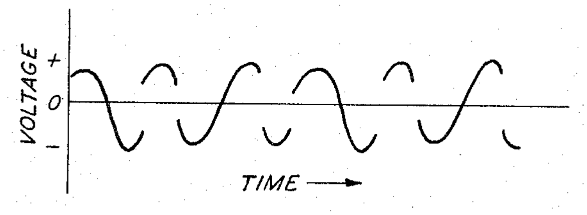
FIGS. 6 and 7 are graphs showing voltage and current waveforms, respectively, in the modulator.
Figure 7:
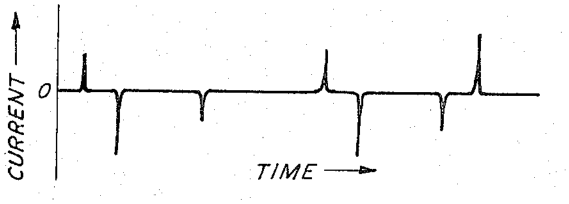

The magnetic pulse modulator employed to provide high-energy, short duration starting pulses to the Fallou circuit such as shown in FIG. 1, is illustrated in FIG. 5. A sinusoidal input is applied across terminals 16 to a series circuit consisting of an inductor 17 and a capacitor 18. A saturating inductor 19 is placed across capacitor 18. The circuit values are adjusted so that saturation of inductor 19 occurs at a rate that is some odd subharmonic of the input voltage. If, as is typically true, the input voltage frequency is 60 cycles per second saturation of inductor 19 is designed to occur every three half-cycles of the input voltage. Whenever the nonlinear inductor saturates, the stored energy in the capacitor causes a high current pulse to flow in the windings of this inductor. This produces a current pulse repetition rate of 20 cycles per second in the modulator. The voltage and current waveforms for inductor 19 are shown in FIGS. 6 and 7, respectively. Saturation occurs every three half-cycles of the input voltage.

Figure 8:
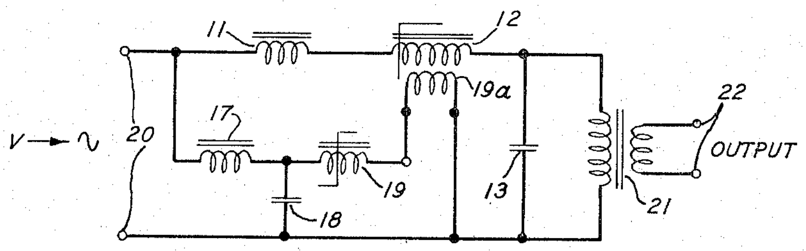
FIG. 8 shows a pulse modulated self-starting Fallou generator.

In accordance with the invention, as shown in FIG. 8, the combined circuit consists of a basic Fallou generator and a pulse modulator. A sinusoidal input is applied across terminals 20 to the basic Fallou circuit that consists of linear inductor 11, nonlinear inductor 12 and capacitor 13. The input sinusoid is applied also to the pulse modulator circuit which consists of its own linear inductor 17 and capacitor 18 in series relation, with nonlinear inductor 19 connected in series with an extra winding 19*a* and then across capacitor 18. The turns of the winding 19*a* are inductively coupled to a portion of nonlinear inductor 12 of the Fallou circuit.

The modulator may provide short bi-phase pulses at a rate $f/n$ where $f$ is the input frequency and $n$ is an odd integer not 1. The values of capacitor 18 and nonlinear inductor 19 are chosen so that the latter saturates when the voltage on the capacitor is equal to $\frac{3}{2}\pi|E_p|$, where $E_p$ is the peak voltage of the input $f$. Linear inductor 17 and capacitor 18 are designed to resonate at the frequency $f$. Accordingly, capacitor 18 will be charged alternatively positive and negative to $\frac{3}{2}\pi E_p$ on each third half-cycle of $f$. On saturation of nonlinear inductor 19 capacitor 18 discharges, providing the shock-excitation necessary to start the oscillations of the Fallou generator. A typical application of the invention is to produce, from a 60 cycle-per-second source, 20 cycles per second for telephone ringing power, in which case, of course, $f=60$ c.p.s. and $n=3$.

Figure 9:
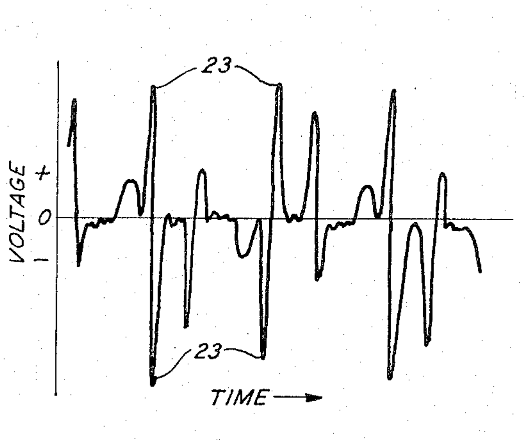
FIGS. 9 and 10 show voltage waveforms in the Fallou portion of the FIG. 8 circuit.
Figure 10:
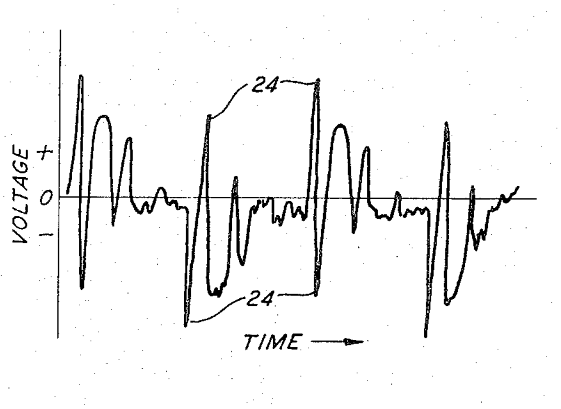
Figure 11:
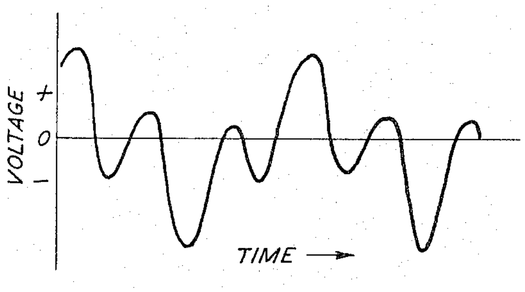
FIG. 11 shows the sum of the voltages in FIGS. 9 and 10.

Capacitor 13 in the Fallou section is sufficiently large in relation to the effective value of capacitor 18, that the starting pulses provided periodically by the magnetic pulse modulator do not appear in the output. This output is usually derived by a transformer coupling across capacitor 13 such as transformer 21, and is shown taken across transformer secondary terminals 22. The starting pulses can be seen in the voltage across inductor 11, shown in FIG. 9. These pulses are designated as positive and negative peaks 23. These pulses also occur in the voltage across nonlinear inductor 12, as shown in FIG. 10 by peaks 24. However, the sum of these voltages, as shown in FIG. 11, has the same general shape as the output voltage of the Fallou generator without the starting circuit connected in. This means that even though the Fallou circuit is triggered continuously, it is still operating in the proper mode.

Figure 12:
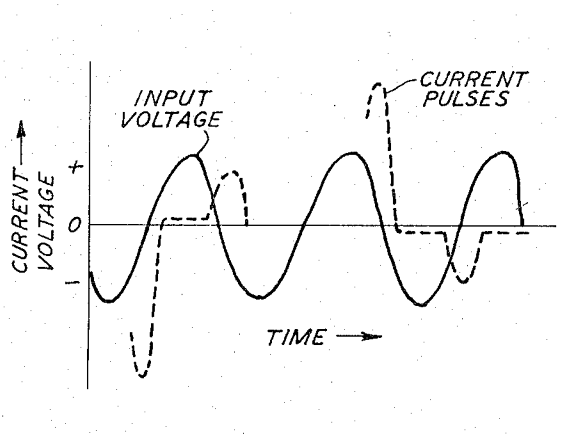
FIG. 12 is a graph superimposing a 60 c.p.s. input upon the output of the pulse modulator.

FIG. 12 shows the relationship of the current pulses in inductor 19 occurring at 20 cycles per second, to the 60 cycle input voltage. A Fallou starting-sustaining pulse is provided every third half-cycle of the input voltage.

Besides self-starting under load, the above-described circuit offers other advantages. Importantly, the circuit is relatively quiet. The elements employed to provide shock-excitation are much more reliable than the conventional relay starting circuits. The circuit exhibits relatively good output voltage regulation with respect to changes in the load. The efficiency of the combined circuit as of this writing, however, is less than that of the simple Fallou generator, which represents the cost of the self-starting feature.

The magnetic pulse modulator described above to illustrate the invention's principle is simple, inexpensive and automatically synchronized with the input frequency. Persons skilled in the art will appreciate, however, that in general any bi-phase pulse modulator properly synchronized with the input and having a very low output impedance would be suitable.

Various changes and modifications may be made to the invention herein described by persons skilled in the art without departing from the spirit and the scope of the claims to follow.

What is claimed is:

1. A subharmonic generator comprising, in combination:

(a) an A-C voltage source having a peak voltage $E_p$ and a frequency $f$;

(b) a first linear inductor, a first nonlinear inductor, and a first capacitor in series relation connected across said source and tuned to oscillate at a frequency $f/n$, $n$ being an odd integer greater than unity;

(c) resonant means connected in shunt relation to said source, resonant at said frequency $f$ and including a second capacitor, said source charging said second capacitor alternately positive and negative on each $n$th half-cycle of said frequency $f$ to a value $$\frac{n}{2}\pi E_p$$

(d) a second nonlinear inductor connected in shunt relation to said second capacitor, and adjusted to saturate when the voltage on said second capacitor reaches the value $$\frac{n}{2}\pi E_p$$

said saturation causing a pulse; and (e) means for applying said pulse to said first nonlinear inductor.

2. A generator in accordance with claim 1 further including means for deriving an output voltage across said first capacitor.

3. A generator in accordance with claim 2 wherein said resonant means comprises a second linear inductor and said second capacitor in series relation.

4. A generator in accordance with claim 3 wherein said pulse-applying means comprises a direct inductive coupling between said second nonlinear inductor and at least a portion of said first nonlinear inductor.

5. A generator in accordance with claim 4 wherein said input frequency $f$ is 60 cycles per second and wherein the value of $n$ is 3.

6. A magnetic modulator for starting and sustaining oscillations in a Fallou type subharmonic generator, said generator being adjusted for a selected odd subharmonic $f/n$ of an input frequency $f$, $n$ being an odd integer, said modulator comprising, in combination, a linear inductor and a capacitor in series relation connected in shunt relation across the input to said generator, a nonlinear inductor connected in shunt relation to said capacitor, said linear inductor and said capacitor being selected to cause saturation in said nonlinear inductor every $n$ half-cycle of said input frequency $f$, each said saturation discharging said capacitor and causing thereby a current pulse in said nonlinear inductor, and means for applying said pulse to said Fallou generator.

7. Apparatus in accordance with claim 6 wherein said subharmonic generator includes a nonlinear inductor and wherein said pulse-applying means comprises a direct inductive coupling between the nonlinear inductor of said generator and the nonlinear inductor of said magnetic modulator.

References Cited

UNITED STATES PATENTS

| | | | |
|---|---|---|---|
| 1,633,481 | 6/1927 | Fallou | 321—69 X |
| 2,088,619 | 8/1937 | Stocker | 321—68 X |
| 2,424,236 | 7/1947 | Huge | 321—69 |
| 2,600,560 | 6/1952 | McMahon | 321—68 |
| 3,235,785 | 2/1966 | Stevens | 321—69 |
| 3,278,829 | 10/1966 | Tillinger | 321—69 |

JOHN F. COUCH, *Primary Examiner.*

G. GOLDBERG, *Assistant Examiner.*